United States Patent Office 3,305,606
Patented Feb. 21, 1967

3,305,606
PROCESS FOR THE PRODUCTION OF GRAFT CO-
POLYMERS OF VINYL CHLORIDE ONTO A PAR-
TIALLY SAPONIFIED ETHYLENE-VINYL ACE-
TATE COPOLYMER
Dietrich Hardt, Bonn, and Herbert Bartl, Cologne-
Stammheim, Germany, assignors to Farbenfabriken
Bayer Aktiengesellschaft, Leverkusen, Germany, a cor-
poration of Germany
No Drawing. Filed Sept. 21, 1965, Ser. No. 489,047
Claims priority, application Germany, Oct. 13, 1964,
F 44,209
8 Claims. (Cl. 260—878)

The present invention relates to a special process for the production of graft polymers from vinyl chloride and/or vinylidene chloride or other copolymerizable monomers and partially saponified ethylene-vinyl ester copolymers.

It is known to graft vinyl chloride and/or vinylidene chloride and other copolymerizable monomers on to partially saponified ethylene-vinyl acetate copolymers, by first of all preparing a partially saponified ethylene-vinyl acetate copolymers, by known methods in inert solvent such as toluene, halogenated hydrocarbons or alcohols or mixtures thereof, isolating and drying the copolymer, dissolving it in the monomer to be grafted on and then subjecting the solution to polymerization. The carrying out of the grafting operation in the presence of the solvent serving as saponification medium leads to low grafting yields and provides products of low molecular weight and less satisfactory properties than according to the known processes.

It has now been found that the partial saponification of the ethylene-vinyl acetate copolymer and the grafting of the monomer advantageously can be carried out in one working step if the saponification of the ethylene-vinyl ester copolymer is effected in the presence of vinyl chloride and/or vinylidene chloride. After ending the partial hydrolysis, a monomer-soluble activator is added to the saponification solution, which is dispersed in water and heated, the monomer or the monomer mixture grafting on to the partially saponified copolymer. It is readily possible for other copolymerizable monomers to be added after the partial hydrolysis.

The working method as described here eliminates the time-consuming isolation, drying of the saponification product and the re-dissolving thereof in the monomers to be grafted on, and also the working up or possibly the loss of the saponification solvent. In addition, the complete reaction can be conducted without interruption in one vessel, which leads to a high volume-time yield.

The process can for example be carried out as follows: a reaction vessel provided with a stirrer mechanism, possibly an autoclave, is charged with the ethylene-vinyl ester copolymer, the monomer (or monomer mixture) which is to be grafted on and which initially serves as saponification medium, an aliphatic alcohol and an acid saponification catalyst. By stirring at slightly elevated temperature (20–30° C.), the copolymer is completely dissolved and is saponified by further raising of the temperature, preferably to 60–80° C., the degree of hydrolysis being determined by the quantity of the alcoholic reesterification component and catalyst and also by saponification temperature and duration. In the case where hydrochloric acid is advantageously used for the saponification, the reaction mixture cooled to room temperature while stirring is neutralized with a small excess of propylene oxide. The polymerization catalyst is thereafter introduced, and if necessary, this is dissolved in some vinyl chloride or vinylidene chloride. In addition, other polymerizable monomers can also be added. After stirring in the activator, water containing a dispersion agent and possibly auxiliary substances such as stabilisers is introduced into the reaction vessel for dispersing the solution of the partially saponified copolymer. A finely divided dispersion is formed by rapid stirring, the temperature in the reaction vessel being kept so low during the dispersion that no polymerization can occur. If necessary, for example when introducing activators with relatively low decomposition temperature, such as isopropyl peroxydicarbonate, the mixture must be cooled during this phase. After the dispersion bead polymerization is initiated by raising the temperature while stirring steadily. The polymer is obtained in finely dispersed or bead form and can be separated from the aqueous phase by filtration or centrifuging.

For this process, it is advantageous to use ethylene-vinyl acetate copolymers with a vinyl acetate content of 25–80% and $[\eta]$ values of 0.2 to 1.5 (viscosity factor). To one part of ethylene-vinyl acetate copolymer, 0.6–9 parts of vinyl chloride, vinylidenechloride or mixtures of the two are introduced prior to the saponification. The alcohols with 1–6 carbon atoms, advantageously methanol or ethanol, which are necessary for the re-esterification should be in the saponification mixture in quantities of 5–100% by weight, calculated on polymer which can be hydrolysed. As saponification catalysts, there are considered the usual acids, such as sulphuric acid, phosphoric acid, alkyl-sulphonic acid with 1–10 carbon atoms, arylsulphonic acids such as benzene-sulphonic acid and toluene sulphonic acid, or Lewis acids, but preferably hydrogen chloride. They are used in quantities of 0.1 to 5% by weight, calculated on the polymer to be saponified. The saponification temperatures are between 20 and 150° and advantageously at 50–80° C.; the choice thereof depends just as much on the desired degree of saponification, which can be adjusted to between 5 and 80%, as it does on the saponification time.

For dispersing the solution of the initially saponified polymer in vinyl chloride and/or vinylidene chloride, there is used an aqueous solution of conventional dispersing agents, for example methyl-cellulose, polyvinyl alcohol or gelatine, the concentration of which is between 0.1 and 3% by weight, based on the water being used. Insoluble organic or inorganic dispersion stabilisers, such as barium sulphate or magnesium oxide, can also be employed. The ratio of water phase to saponification solution can be between 1:1 and 5:1.

The initiation of the polymerization is effected with the usual monomer-soluble organic and readily decomposable peroxy compounds or readily decomposable azo compounds. The quantities of activator used are between 0.01 and 3% by weight, based on the sum of graft substratum and grafting monomers. For producing particular properties, it is possible to select peroxy compounds which decompose even at room temperature and lead to polymers of high molecular weight, such as isopropyl peroxydicarbonate or acetylcyclohexane sulphonyl peroxide. The polymerization temperatures are between 20 and 80° C. It is possible to influence the molecular weights by adding the usual regulators, more especially halogenated hydrocarbons, such as chloroform, trichloroethylene and the like.

According to one particular form of the process, subordinate quantities of further vinyl compounds in admixture with vinylchloride and/or vinylidene chloride are grafted after the saponification on to the partially saponified substratum, whereby for example an improved solubility, more extensive cross-linking capacity, improved bonding strength, colorability or workability are obtained.

The following are considered as monomers:

(a) α,β-unsaturated monocarboxylic and dicarboxylic acids with 3–4 carbon atoms, including their derivatives, such as maleic acid esters and semiesters with 1–18 carbon atoms in the alcohol radical, the corresponding fumaric acid derivatives, acrylates and methacrylates with 1–4 carbon atoms in the alcohol radical, hydroxypropyl methacrylate, ethylene glycol methacrylate, N-methylol acrylamide, and others.

(b) Vinyl esters such as vinyl acetate, vinyl propionate, and vinylbutyrate.

(c) Vinyl ethers such as methylvinyl ether or vinyl isobutyl ether, vinyl-n-butyl ether and also acrylonitrile and styrene.

These monomers can be added separately or in admixture with one another and in such quantities to the batch prior to the polymerization that the proportion thereof makes up to 30% by weight of the monomer mixture which is to be grafted on.

The properties of the polymers obtained by this process depend to a large extent on their composition, particularly the ratio between vinyl chloride (or vinylidene chloride) and the initially saponified grafting substratum.

fication takes place with further stirring for 5 hours at 70° C. After the contents of the autoclave have been cooled to 20° C., 25 g. of propylene oxide for neutralization purposes and the activator, 5 g. of azodiisobutyronitrile, are forced in and stirring is continued for 1 hour at 20° C. The introduction of the activator can be effected with the aid of a solvent, such as methanol, or also with some vinyl chloride. Thereafter, a solution of 200 parts of methyl cellulose in 20,000 parts of water is introduced into the autoclave, whereupon stirring takes place for 5 hours at room temperature and thereafter polymerization for 15 hours at 62° C.

After filtering and washing with water, there are obtained 8040 parts of a finely dispersed bead polymer, which is composed of 42% of vinyl chloride polymer and 58% of partially saponified ethylenevinyl acetate copolymer. The K-value is 73 and the hydroxyl content is 1.8%. The polymer is for example soluble in tetrahydrofuran and forms clear and strong films therefrom.

EXPERIMENTS CARRIED OUT ACCORDING TO EXAMPLE 1

| | Copolymer of ethylene and vinyl acetate | | Vinyl-chloride, parts | Methanol, parts by volume | HCl, parts | Methyl cellulose, parts | Propylene oxide, parts | Saponification time | Values of the graft copolymers | | | |
|---|---|---|---|---|---|---|---|---|---|---|---|---|
| | Parts | Content VAc, percent | | | | | | | Percent chlorine | Percent PVC polymer | Percent OH | K-value |
| a | 3,600 | 45 | 5,400 | 900 | 12 | 50 | 25 | 5 h | 30.4 | 54 | 1.8 | 69 |
| b | 3,600 | 45 | 5,400 | 450 | 12 | 50 | 25 | 5 h | 31.3 | 55 | 0.8 | 70 |
| c | 1,500 | 45 | 6,500 | 900 | 12 | 200 | 25 | 5 h | 42.7 | 76 | 0.7 | |
| d | 3,000 | 45 | 5,000 | 2,000 | 60 | 200 | 130 | 20 h | 20.4 | 36 | 5.7 | |
| e | 5,000 | 45 | 3,000 | 900 | 12 | 100 | 25 | 5 h | 6.15 | 11 | 4.7 | 71 |
| f | 3,600 | 30 | 5,400 | 900 | 12 | 100 | 25 | 5 h | 29.7 | 53 | 1.9 | 63 |
| g | 3,600 | 66 | 5,400 | 900 | 12 | 100 | 25 | 5 h | 30.0 | 54 | 1.4 | 88 |

NOTE.—In all cases the saponification temperature was 70° C., the polymerization time was 15 hours and the polymerization temperature 62° C.; in all examples 20,000 parts of water are used, 5 parts of azodiisobutyronitrile are used as catalyst.

There can be obtained in this way a continuous transition from hard polymers with high vinyl chloride or vinylidene chloride contents to products of which the properties depend on a high proportion of saponified ethylene-vinyl ester copolymer. The range of transition between the hard tough polymers and the flexible, soft products with a low halogen content can best be compared with softened poly-vinyl chloride or polyvinylidene chloride. By way of example, soft polymers contain 0.6 part of vinylchloride to 1 part by weight of vinyl acetate-ethylene copolymer and hard polymers contain 9 parts of vinyl chloride to 1 part by weight of polymer. A feature common to all products is the complete solubility in solvents such as tetrahydrofuran and cyclohexanone. The scale of the suitable organic solvents becomes increasingly broader with decreasing halogen content. Products with a low vinyl chloride content are for example soluble in methylethylketone and glycol monomethylacetate.

Particularly to be emphasised is the capacity of the polymers to cross-link by way of the free OH-groups of the substratum, and this can be further extended by grafting vinyl compounds with free OH-groups, as for example hydroxypropyl methacrylate.

The products are preferably applied from solution and are suitable as lacquers, coatings, anti-corrosion coatings, impregnations and the like. However, this does not exclude a processing to form shaped elements.

In the following examples, the parts indicated are parts by weight, unless otherwise mentioned.

*Example 1*

A stirrer-type autoclave with an enamel lining is filled with 5000 parts of a copolymer of ethylene and vinyl acetate with a vinyl acetate content of 45%, 5000 parts of vinyl chloride and a solution of 12 parts of hydrogen chloride in 900 parts by volume of ethanol and then closed. The mixture is stirred for 2 hours at 20° C. and saponi-

*Example 2*

As described in Example 1, 3600 parts of a copolymer of ethylene and vinyl acetate with a vinyl acetate content of 45% are saponified in 5400 parts of vinyl chloride and 900 parts by volume of methanol with 12 parts of hydrogen chloride for 5 hours at 70° C. After cooling to 20° C., the mixture is neutralized with 25 parts of propylene oxide and stirring takes place for another hour. Then, after adding a solution of 200 parts of methyl cellulose in 20,000 parts of water, vigorous stirring is carried out for 4–5 hours at 20° C. The mixture is thereafter activated with a solution of 20 g. of acetyl cyclohexane sulphonylperoxide in 100 ml. of methanol and polymerized for 15 hours at 20° C. and thereafter for 5 hours at 30° C. The stirring speed is 200–300 r.p.m.

The finely dispersed product is composed of 56.5% of PVC polymer and 43.5% of partially saponified ethylene-vinyl acetate copolymer. The OH-content is 1.2%. The polymer is soluble in tetrahydrofuran and cyclohexanone.

*Example 3*

A solution of 360 parts of a copolymer of ethylene and vinyl acetate with a vinyl acetate content of 45% in 640 parts of vinylidene chloride and a solution of 1.5 parts of hydrogen chloride in 90 parts of methanol are prepared in a flask having a stirrer mechanism and an efficient reflux condenser and stirred for 5 hours at reflux temperature. Neutralization is then effected with 3 parts of propylene oxide. While vigorously stirring, there is added to the viscous solution a solution of 10 parts of methyl cellulose in 1500 parts of water and is dispersed in the aqueous phase. The reaction vessel is simultaneously cooled to 15–20° C. By adding a solution of 1 part of acetyl-cyclohexane sulphonyl peroxide in 10 parts of vinylidene chloride, the mixture is activated and is then polymerized for 5 hours at 20° C.

and for another 10 hours at 30° C. There are obtained 810 parts of a bead polymer with a chlorine content of 43.4%, which is soluble in hot dimethylformamide. The hydroxyl content is 1.1%.

*Example 4*

A solution of 3600 parts of a copolymer of ethylene and vinyl acetate with a vinyl acetate content of 45% in a mixture of 5400 parts of vinyl chloride, 500 parts of trichlorethylene, 900 parts by volume of methanol and 12 parts of hydrogen chloride is prepared in an enamel stirrer-type autoclave by stirring the mixture for 2 hours at room temperature. Saponification thereafter takes place with further stirring for 5 hours at 70° C. 25 parts of propylene oxide, 25 parts of azodiisobutyronitrile, 250 parts of maleic dodecyl semi-ester and 500 parts of vinyl acetate are added to the saponification solution, after cooling it to 20–30° C., and is stirred for another hour at 20° C. 20,000 parts of a 1% solution of methyl cellulose in water are then forced into the reaction vessel. The organic phase is dispersed in water by rapid stirring for 3 hours. For polymerization purposes, heating now takes place with vigorous stirring for 15 hours at 62° C. After washing and drying, there are obtained 8420 parts, of a finely dispersed bead polymer with a K-value of 58, which is soluble in tetrahydrofuran or methyl-ethylketone and shows the following analysis values:

27.4% of chlorine
9.2% of oxygen
1.0% of OH
10.5% of $COCH_3$
Acid number 21.4.

*Example 5*

4000 parts of a copolymer of ethylene and vinyl acetate with a vinyl acetate content of 45% are saponified, as described in Example 4, in 3800 parts of vinyl chloride, 400 parts of trichlorethylene and a solution of 12 parts of hydrogen chloride in 900 parts by volume of methanol, the mixture being neutralized after saponification with 25 parts of propylene oxide and thereafter polymerized after adding 12.5 parts of azodiisobutyronitrile, 200 parts of maleic dodecyl semiester and 400 parts of vinyl isobutyl ether, likewise under the conditions of Example 4; in this way, there is obtained a bead polymer which is completely soluble in methyl ethyl ketone and shows the following analysis values:

18.7% of chlorine
12.9% of oxygen
2.4% of OH
11.4% of $CH_3CO$
Acid number 10.5.

What is claimed is:
1. A process for the production of graft polymers from at least one mono-olefinically unsaturated polymerizable compound and partially saponified ethylene-vinyl acetate copolymers in an aqueous dispersion comprising partially saponifying the copolymer in the presence of vinyl chloride, vinylidene chloride or mixtures thereof and polymerizing the resulting saponification solution.

2. A process according to claim 1 wherein at least one additional copolymerizable monomer is added to the saponification solution prior to polymerization.

3. A process according to claim 1 wherein from 0.6 to 9 parts by weight of vinyl chloride, vinylidene chloride or mixtures thereof per part copolymer is present during saponification.

4. A process according to claim 1, wherein ethylene-vinyl acetate copolymers with $[\eta]$ values of 0.2 to 1.5 and vinyl acetate contents of 25–80% by weights are used.

5. A process according to claim 1, wherein the degree of saponification of the ethylene-vinyl acetate copolymer is 5–80%.

6. A process according to claim 1, wherein after the saponification, at least one member selected from the group consisting of vinyl esters with 1–4 carbon atoms in the acid radical, vinyl-alkyl ethers with 1–4 carbon atoms in the alkyl radical, $\alpha,\beta$-unsaturated monocarboxylic acids and $\alpha,\beta$-unsaturated dicarboxylic acids with 3–4 carbon atoms, esters of $\alpha,\beta$-unsaturated monocarboxylic and dicarboxylic acids with 1–18 carbon atoms in the alcohol radical, or mixtures thereof, are used as copolymerizable monomers in an amount up to 30% by weight based on the total monomer.

7. A process for the production of graft polymers comprising
   (a) partially saponifying to a saponification degree of from 5 to 80 percent an ethylene-vinyl acetate copolymer in the presence of from 0.6 to 9 parts by weight per part ethylene-vinyl acetate copolymer of a member selected from the group consisting of vinyl chloride, vinylidene chloride or mixtures thereof and
   (b) polymerizing the saponification solution obtained in step (a).

8. A process according to claim 7 wherein after saponification at least one copolymerizable monomer selected from the group consisting of $\alpha,\beta$-unsaturated mono and dicarboxylic acids having 3 to 4 carbon atoms, maleic acid esters and semi esters having up to 18 carbon atoms in the ester group, fumaric acid esters and semi esters having up to 18 carbon atoms in the ester group, acrylic and methacrylic acid esters having up to 4 carbon atoms in the ester group, hydrocypropyl methacrylate, ethylene glycol methacrylate, N-methylol acrylamide, vinyl acetate, vinyl propionate, vinylbutyrate, methylvinyl ether, vinylisobutyl ether, vinyl-n-butyl ether, acrylonitrile and styrene is added in an amount up to 30 percent by weight based on total monomer to the saponification solution before polymerization in step (b).

No references cited.

MURRAY TILLMAN, *Primary Examiner*.
J. T. GOOLKASIAN, *Assistant Examiner*.